(No Model.)
J. SINCLAIR.
PROCESS OF JOINING THE ENDS OF WIRE CLOTH FOR PAPER MACHINES.
No. 309,658. Patented Dec. 23, 1884.
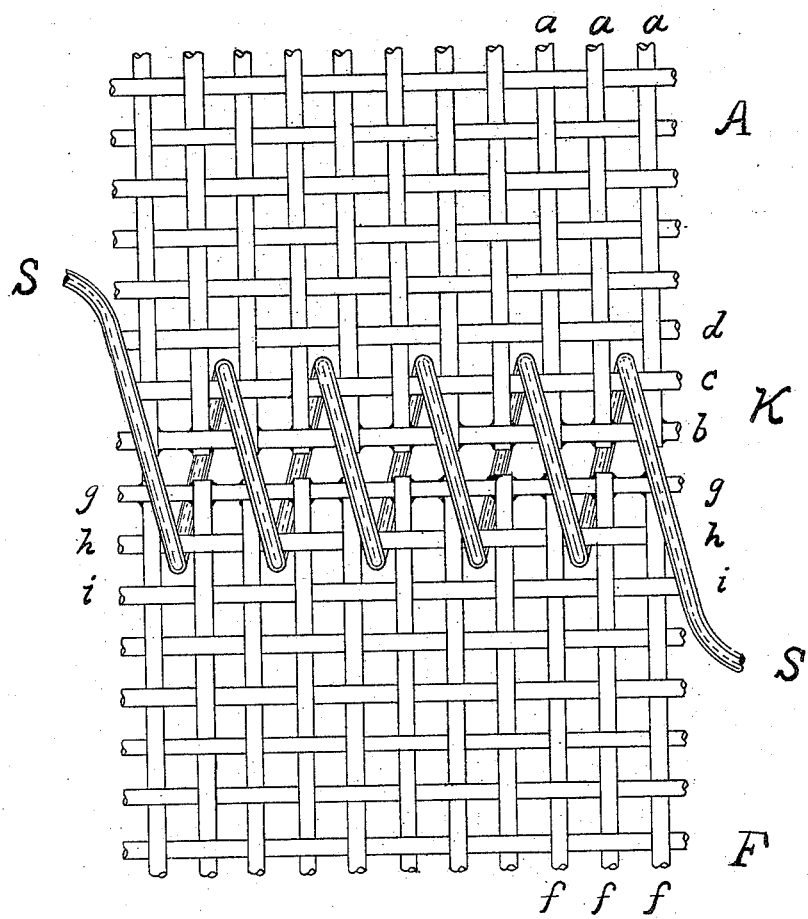
Witnesses
Geo. L. Dickinson.
W. C. Gaylord.
Inventor
John Sinclair, by
H. K. Hawes, Atty.

United States Patent Office.

JOHN SINCLAIR, OF HOLYOKE, MASSACHUSETTS, ASSIGNOR TO BUCHANAN, BOLT & CO., OF SAME PLACE.

PROCESS OF JOINING THE ENDS OF WIRE-CLOTH FOR PAPER-MACHINES.

SPECIFICATION forming part of Letters Patent No. 309,658, dated December 23, 1884.

Application filed August 15, 1884. (No model.)

*To all whom it may concern:*

Be it known that I, JOHN SINCLAIR, a subject of the Queen of Great Britain, residing at Holyoke, in the county of Hampden and State of Massachusetts, have invented certain new and useful Improvements in the Process of Joining the Ends of Wire-Cloth for Paper-Machines; and I do hereby declare that the following is a full, clear, and exact description of the invention, reference being had to the accompanying drawing, forming a part thereof.

My invention especially relates to the formation of the seam in the wire-cloth used in paper-machines; and the objects of my improvements are to make a smoother seam than at present in use, whereby the line of junction is more similar to the surrounding surface, and to produce a seam less liable to clog or collect particles of stock and produce defects in the paper.

In the accompanying drawing, A and F represent the two pieces or ends of the cloth to be joined. A is composed of the longitudinal wires $a\ a$, &c., interwoven with the transverse wires $b\ c\ d$, &c. The piece F is composed in a similar manner of the wires $f\ f$ and $g\ h\ i$, &c.

To form the improved seam the wires $b$ and $g$ are united to the ends of their respective longitudinal wires $a\ a\ a$ and $f\ f\ f$ by brazing, by hard solder or soft solder, or by any other suitable and similar process. This soldering is done for the purpose of giving a firm edge to receive the stitching. After the soldering, the ends of A and F are brought parallel, as at K, and held in a suitable manner for convenience. Then a wire, S, similar to the wires $a\ a$, $f\ f$, &c., is laced through the two ends, with an over-and-over stitch, passing around the wires $c$ and $h$, which are back of and adjacent to the soldered wires $b$ and $g$, as shown in the drawing.

By means of the soldering, as described, a firm edge is produced, which allows the wire S to be placed near the edges, as shown. Without the soldering more stitches must be taken, and at a greater distance from the edges, and hence the improvements give a simpler, stronger, smoother, and better seam than those now in use.

Having fully described my invention, what I desire to claim and secure by Letters Patent is—

1. In a seam for wire-cloth, the process of brazing or soldering the outside transverse wires to the ends of the longitudinal wires, substantially as and for the purpose set forth.

2. In a seam for wire-cloth, the combination of the brazed or soldered wires $b$ and $g$, the adjacent wires $c$ and $h$, and the lacing-wire S, substantially as described.

JOHN SINCLAIR.

Witnesses:
H. K. HAWES,
E. ROBERGE.